United States Patent
Poulter et al.

(10) Patent No.: US 7,062,569 B2
(45) Date of Patent: Jun. 13, 2006

(54) CASCADE CONTROL ARCHITECTURE AND OPERATION FOR PACKET-BASED COMMUNICATION SYSTEMS

(75) Inventors: Alan R Poulter, Elstow (GB); Quang T Tran, Hemel Hempstead (GB); Sharon L Wiles, Bovingdon (GB); David J Law, Kempston (GB); Christopher A Walker, Watford (GB)

(73) Assignee: 3Com Corporation, Santa Clara, CA (US)

( * ) Notice: Subject to any disclaimer, the term of this patent is extended or adjusted under 35 U.S.C. 154(b) by 890 days.

(21) Appl. No.: 09/764,412

(22) Filed: Jan. 19, 2001

(65) Prior Publication Data

US 2002/0057683 A1 May 16, 2002

(30) Foreign Application Priority Data

Nov. 1, 2000 (GB) .............................................. 0026625

(51) Int. Cl.
*G06F 15/173* (2006.01)

(52) U.S. Cl. ....................................... 709/238; 709/223
(58) Field of Classification Search ................ 370/222, 370/452, 456, 424, 223, 360, 387, 394
See application file for complete search history.

(56) References Cited

U.S. PATENT DOCUMENTS

| | | | | | |
|---|---|---|---|---|---|
| 4,646,292 A | * | 2/1987 | Bither | ........................ | 370/437 |
| 5,566,177 A | * | 10/1996 | Bhandari et al. | ........... | 370/452 |
| 5,949,754 A | * | 9/1999 | Takahashi | .................... | 370/222 |
| 6,041,036 A | * | 3/2000 | Baek et al. | .................. | 370/222 |
| 6,125,412 A | * | 9/2000 | Picard et al. | .................. | 710/48 |
| 6,684,258 B1 | * | 1/2004 | Gavin et al. | ................. | 709/251 |

FOREIGN PATENT DOCUMENTS

| GB | 2350032 A | 11/2000 |
|---|---|---|
| GB | 2357390 A | 6/2001 |

\* cited by examiner

*Primary Examiner*—Zarni Maung
*Assistant Examiner*—Karen C Tang
(74) *Attorney, Agent, or Firm*—Nixon & Vanderhye P.C.

(57) ABSTRACT

A control device for a unit in a cascade connection of network units includes control logic which increments a count of active units and passes the count to the next control device. The count is initiated and terminated by an absence of control messages at the down port and up port respectively. The incremented count is passed up the cascade and a final count is passed down the cascade.

5 Claims, 4 Drawing Sheets

| Down Port | Up Port | Position In Stack |
|---|---|---|
| No LinkOk | No LinkOk | No Cascade (Single Unit) |
| No LinkOk | LinkOk | Bottom of Stack |
| LinkOk | No LinkOk | Top of Stack |
| LinkOk | LinkOk | Middle of Stack |
FIG. 2
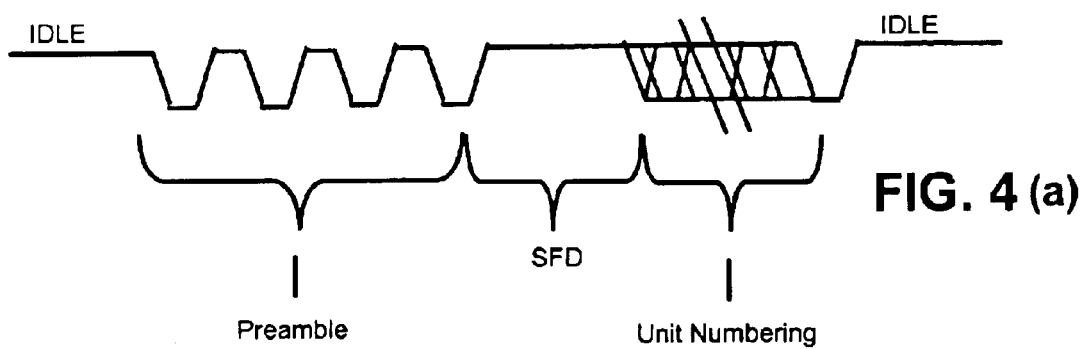
FIG. 4 (a)
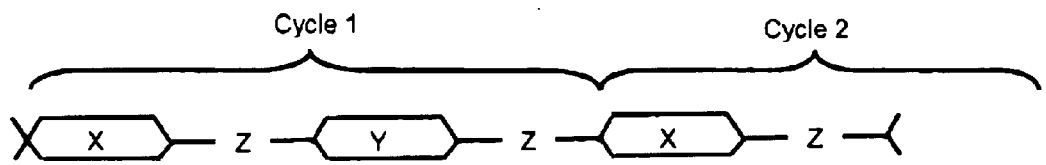
FIG. 4 (b)

Elapsed Time

Elapsed Time

Elapsed Time

Elapsed Time

Elapsed Time

Elapsed Time

CASCADE CONTROL ARCHITECTURE AND OPERATION FOR PACKET-BASED COMMUNICATION SYSTEMS

CROSS-REFERENCE TOP RELATED APPLICATION

Poulter et al, Ser. No. 09/662,158 filed Aug. 1, 2000, entitled 'CASCADE CONTROL ARCHITECTURE AND OPERATION FOR PACKET-BASED COMMUNICATION SYSTEMS' and commonly assigned herewith.

This invention relates to the cascade connection of a plurality of 'stackable' units for a packet-based communication system. The invention more particularly relates to the physical architecture of the control path for such a cascade connection and the intercommunication of control messages for units which participate in the cascade

BACKGROUND TO THE INVENTION

The physical elements in a packet-based data communication system typically include multi-port network units such as switches and hubs. Such network units are commonly and conveniently manufactured with a fixed plurality of ports by means of which the network units are connected by way of appropriate transmission media or links to other network units or users, represented by data terminals, personal computers and so on. In order to provide greater versatility in constructing the physical layout of networks by minimizing the number of different sizes of units that need to be deployed it is common to render the units 'stackable'. This term is intended to mean that a multiplicity of such units can be connected to form effectively a single controllable entity. Thus, merely by way of example, three switches each with 24 ports may be 'stacked' so that effectively they constitute a single switch with 72 ports. It is customary to make such units physically stackable in a column though this physical aspect of the term 'stackable' is not essential to the meaning of the term or the present invention.

In order to provide intercommunication between the network units, so that for example a packet received at the port of any one of the units may be forwarded from a port or ports on a different unit or even a multiplicity of different units in the stack, depending on the addressing of the packet, it is customary to connect the stacked units together by means of a cascade, which is the term used for the communication links and associated control functions by means of which packets are transmitted from one unit to each other unit in the stack. The cascade allows users to be connected to any of the units in the stack and needs to be organised so that the stack can be managed as a single logical entity.

From the operational point of view, the forwarding of packets on the cascade has to be controlled according to a variety of rules which are intended to conform to the forwarding rules relevant to different types of packets (such as unicast, multicast and broadcast) as well as other relevant rules, such as those relating to bridging. An example of such a rule is the prevention of the forwarding of a packet out on a port by which it has been received. Such rules may need to be modified to make the operation of the cascade more convenient or more versatile, as exemplified in prior copending patent applications Ser. No. 09/511,118 filed 23 Feb. 2000 by Drummond Murray et al and Ser. No. 09/668, 339 filed 25 Sep. 2000 by O'Keeffe et al (now U.S. Pat. No. 6,801,950 issued Oct. 5, 2004).

Two variable values which are the basis of the operational control of a stack are the unit numbering, namely some numerical or coded quantity which identifies and distinguishes each physical unit in the stack and an 'active unit' total, which indicates the number of units actively participating in the stack. It is desirable to compute the unit numbering of the units in a stack and the active unit total and to convey the active unit total to all units in the stack automatically.

It is possible to employ an 'in-band' configuration in which the configuration process by means of which the units are allotted their stack identification by means of configuration packets sent during a configuration routine on the data path for packets connecting the unit in the stack. Such a system is described, for example, in GB published Patent Application No. 2338155, which describes a cascade connection in which packets are employed to configure the cascade such that only one unit, called the master, is allowed to place packets on the cascade connection at any time. The prior copending Patent Application for Byham et al, Ser. No. 09/369,323 filed 6 Aug. 1999 describes an automatic configuration process by means of which configuration packets are used to determine which unit is deemed to be at the bottom of the stack not withstanding the provision of resilience or possible misconnection of connecting cables.

Prior co-pending patent application Ser. No. 09/662,158 for Poulter et al, filed 1 Aug. 2000, entitled 'Cascade Architecture and Operation for Packet-based Communication Systems' and fully incorporated by reference herein describes a system, devised by various inventors common to the inventors of the present Invention, in which control messages travel around the cascade connection by a control path distinct from the path of data packets and are employed in the establishment of the identification numbers for the units in the stack and are also employed for computing an 'active unit total'. The system described in that application is a particularly versatile system which can accommodate the 'hot' insertion or removal of active units and which can be employed to compute the 'active unit total' which takes into account the units which are within the cascade but which may be powered down or otherwise not actively participating in the cascade.

The physical architecture required in the earlier application Ser. No. 09/662,158 is, as far as its preferred implementation is concerned, based on the use of special three-port connectors which define paths for the packets and the control messages and is furthermore organised so that if a unit which is connected to a connector is powered down or inoperative, the system still provides, by means of the relevant connector, both an unbroken data path and all unbroken control path around the cascade. That earlier application also describes 'cascade modules' by which a network unit can be connected in the cascade.

There is however a need for a system which provides at least some of the functionality of the earlier system, and in particular the computation of unit numbering and an active unit total, and which can be implemented in circumstances where the earlier system is either not feasible or not needed. For example if the available terminal connectors have insufficient terminals for supporting the variety of signals and control paths required in practice for the system described in the co-pending application, the system described in Ser. No. 09/662,158 cannot be satisfactorily employed. Furthermore, the 'hot swap' facility might not be needed. As will become more apparent, the present invention may be implemented in a simple manner without a 'hot swap' facility, though that facility may be provided within the scope of the invention.

SUMMARY OF THE INVENTION

The present invention is based on the provision of a control path for the units in the cascade, the control path being employed for the conveyance of control messages that represented an accumulated stack identification number and active unit total. However, the architecture is organised so that the absence of valid control messages at particular ports is employed to determine whether the relevant network unit is the first (that is to say the 'bottom') unit in a stack or the last (that is to say the 'top') unit in a stack. This information can be used to start and terminate the process of the stack identification numbering and the computation of an active unit total. The invention may be implemented within stackable units such as switches but could also be provided in modules for use with such units.

Other and more particular features of the invention will become apparent from the following detail description with reference to the drawings.

BRIEF DESCRIPTION OF THE DRAWINGS

FIG. 2 is a table showing the interpretation of control messages by the units in the stack

FIGS. 4(a) and 4(b) illustrate the physical nature of control messages preferably employed in the preferred example

DETAILED DESCRIPTION OF A PREFERRED EXAMPLE

Figure 1:
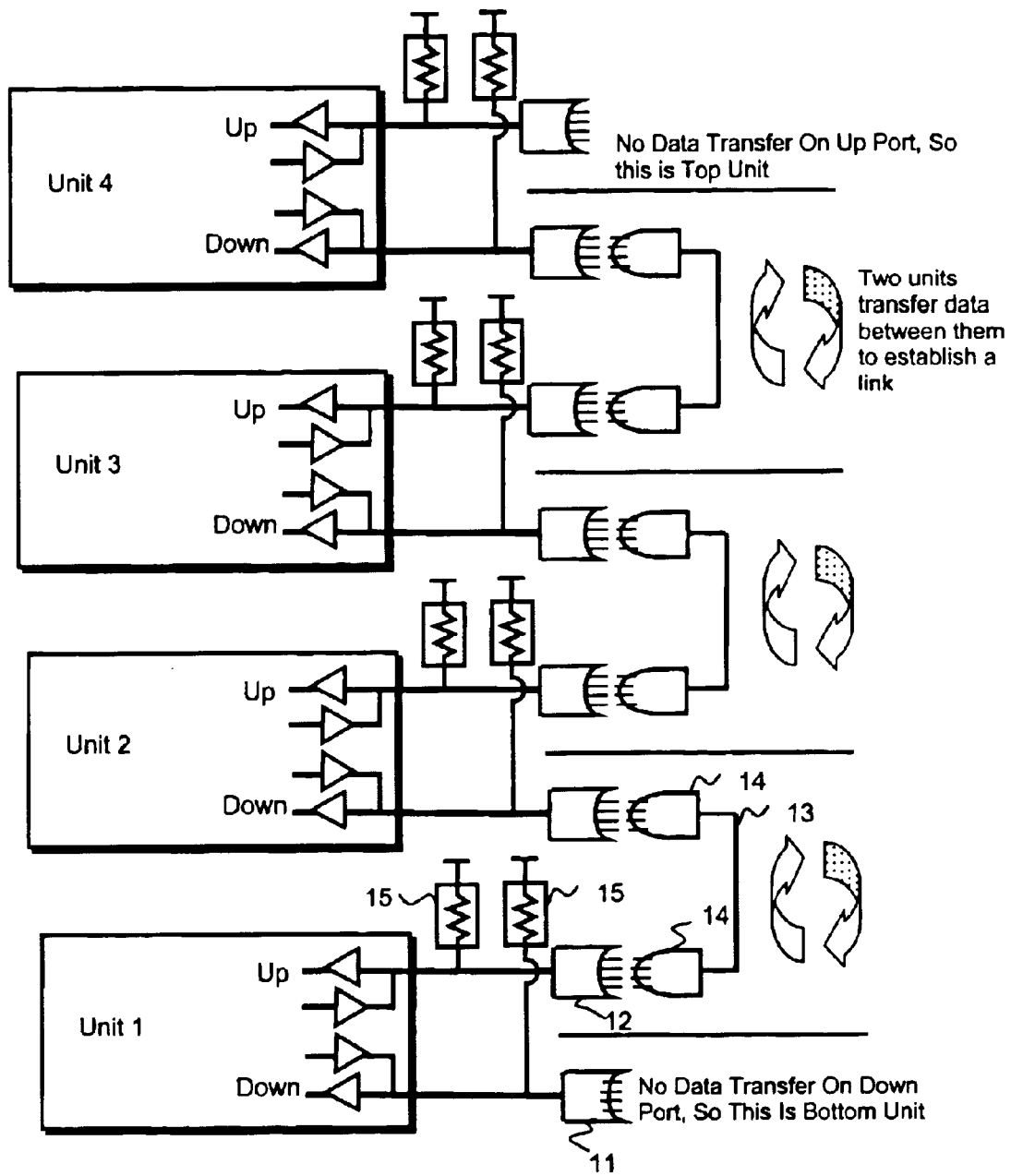
FIG. 1 illustrates a stack of communication units connected by a cascade according to the invention

FIG. 1 illustrates a stack of four multi-port communication network units which may comprise a multiplicity of switches. Typically, each switch may be a multi-port switch which has a multiplicity of ordinary ports for connection to users and, in this example, 'cascade' ports by means of which the unit is connected so as to supply packets to or receive packets from other units in the stack.

For convenience, the network units in the stack are denoted "Unit 1", "Unit 2" etc. Also, for the sake of simplicity the Figures illustrates a system in which the hardware components (and particularly the control device in FIG. 5) required for the invention are located within each of the units.

Each of the units has an 'up' port and a 'down' port. Within each unit the up port and the down port are connected to logic circuits which perform appropriate processing of packets which are to be forwarded from the unit onto the cascade or are received from another unit by way of the cascade. Although such processing is essential to a practical system, the manner in which the processing is organised and other things such as the imposition of forwarding rules and so on are not directly relevant to the present invention.

Each of the down port and up port in each unit is provided with a multi-pin terminal. These are shown as terminals 11 and 12 respectively for the bottom Unit 1. The up port of a unit is connected to the down port of the next by way of a cable 13 in known form terminated at both ends by means of a connector 14 which is compatible with the terminal on each unit. Such a cable needs to be able to convey packets in the relevant format on respective lines and needs also to have at least one line for the connection of control messages. The present invention in its preferred form is intended to be implemented using only one control line which will therefore require only a minimum of pins on the port connectors.

A cascade connection is made by connecting the up port of each unit to the down port of the next in turn, leaving the down port of one unit, in this example the down port of the Unit 1, and the up port of another unit, in this example the up port of Unit 4, unconnected.

For the sake of simplicity, only the control line, namely the single control line 13 used for the control messages to be described, is shown for each connector in FIG. 1. This presumes that the units have a common datum (such as earth) for control signals conveyed on the line.

Shown in FIG. 1 and intended for further explanation below is a clamping (e.g pull up) resistor 15 for each control line to a VCC bus within each of the communication units. Unit 1 to Unit 4.

FIG. 1 also shows the basic operational scheme of the invention. It will be seen that the up port of Unit 1 is connected to the down port of Unit 2, the up port of Unit 2 is connected to the down port of Unit 3 and the up port of Unit 3 is connected to the down port of Unit 4. Thus there is a control path by means of which, at different times, the respective adjacent units can exchange control messages. However, the down port of Unit 1 and the up port of Unit 4 are not connected and are therefore unable to receive valid control messages. This fact is exploited by logic within the units to establish Unit 1 as the bottom unit in the stack and Unit 4 as the top unit in the stack.

Preferably, those units which have a connection from the up port of one to the down port of the other exchange control messages so that the logic within the units establishes whether the link between the respective units has been established or not. The relevant states are 'LinkOk' and 'no LinkOk' respectively. FIG. 2 summaries the status of the ports and it will be seen that if 'LinkOk' is established for both ports of a unit the unit is deemed to be in the middle of a stack whereas if there is no LinkOk signal developed for the up port and the down port then the unit is deemed not to be part of a cascade.

FIG. 3 illustrates the stack, shown in this particular example as a stack of four, at various stages in the preferred configuration process. Each of the units will at relevant times transmit a signal that contains a stack identification number. In this example the stack identification number will correspond to the active unit count and the stack identification number of the top unit will eventually correspond to the active unit total.

Figure 3A:
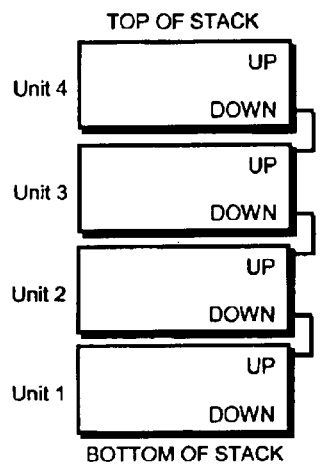
FIGS. 3a–3f represents the stack at various stages of a configuration process.
Figure 3B:
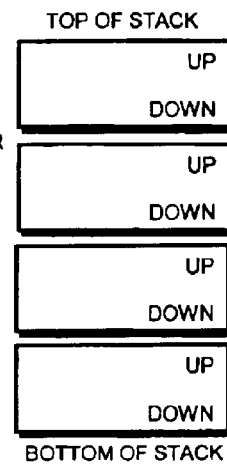

FIG. 3(a) shows at the end of a first cycle the transmission of a signal from the up port of Unit 1 to the down port of Unit 2. Unit 1 has already determined, by virtue of the presence of LinkOk status for its up port and no LinkOk status for its down port that it is at the bottom of the stack and accordingly it can transmit a signal which for the sake of simplicity is represented as 'I am 1' from its up port to the down port of Unit 2. At this time Unit 2 does not yet know the total number of units and accordingly by default it transmits an 'out of range' number, shown herein as 'OOR' Thus from its up port it transmits a signal which is called for simplicity 'I am OOR'. Unit 3 transmits a similar signal from its up port to Unit 4.

In practice, as will be seen later, a message such as 'I am X' is constituted by a numerical value (X) in a dedicated field in a formatted control message.

In the next cycle, since the number of units has still not been established, the units transmit from their down ports to the up port of the next unit below a signal which is shown as 'Total OOR', representing an out-of-range (invalid) value for the active unit total.

Figure 3C:
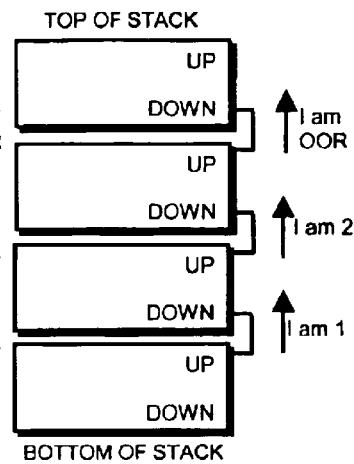

FIG. 3(c) shows the next phase in which Unit 1 continues to transmit 'I am 1' from its up port to the down port of Unit 2 whereas now Unit 2 transmits 'I am 2' from its up port to the down port of Unit 3 Unit 3 still transmitting 'I am OOR' from its up port and down port of Unit 4.

Figure 3D:
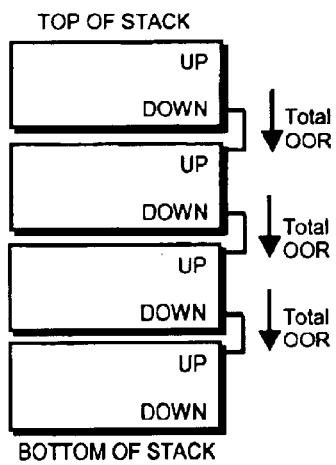

FIG. 3(d) shows the next phase in which, since the total of units that has not yet been established, there is a transmission of a 'Total OOR' from the top of the stack downwards.

Figure 3E:
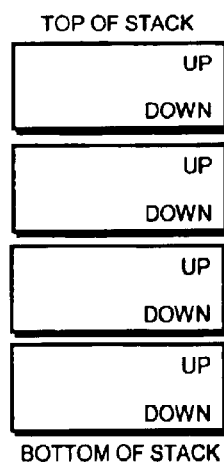

FIG. 3(e) shows the next phase in the configuration cycle wherein in addition to the signals transmitted from Unit 1 and 2 in FIG. 3(c), Unit 3 is transmitting 'I am 3' from its up port to the down port of the stack.

Figure 3F:
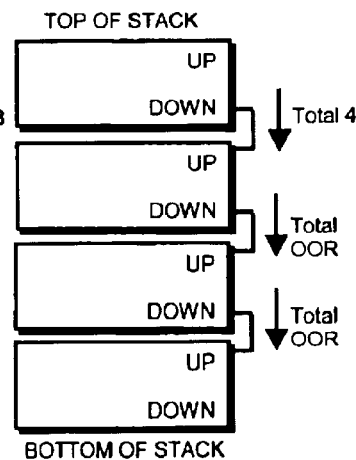

Finally, FIG. 3(f) shows the transmission of a 'Total 4' from the unit at the top of the stack downwards This last figure shows 'Total OOR' transmitted from the down ports of Unit 3 and 2. During following cycles the message 'Total 4' will be transmitted down the rest of the stack until the up ports of Units 2 and 1 receive the message 'Total 4'.

FIG. 4(a) shows a control message of the type which may be employed in the present invention. This control message resembles that shown in the aforementioned application Ser. No. 09/662,158 It is in the form of a packet comprising a preamble, typically four bits at a bit rate different from the rest of the numbering, a start frame delimiter, which may be a short period at a tri-state value, followed by several data bytes transmitting either up port data or the down port data. The 'up port' data is a number identifying the respective unit The 'down port' data is a number which represents eventually an 'active unit total' though, as already explained the total will initially be 'out of range'.

Other fields could be included in the control messages broadly on the lines as described in application Ser. No. 09/662,158.

The logic in each unit therefore needs to generate, in the format shown for example in FIG. 4, the messages shown in FIG. 3.

If the unit is at the bottom of the stack, the up port data will signify the message 'I am 1' and therefore the 'X' data represents '1' which is the active unit count at the up port of Unit 1 and also the numbering of Unit 1. The logic will (if the unit is not at the bottom of the stack) produce up port data representing an out of range number (OOR) until the unit's logic receives an in-range number at its down port and will then increment that number by unity.

The logic is also required to produce down port data (Y). If the unit is at the top of the stack the 'down port data' is initially 'out of range' and eventually the active unit total. If the unit is not at the top of the stack the down port data corresponds to the data which the unit receives at its up port, as described with reference to FIG. 3.

FIG. 4(b) illustrates a preferred cycle of generation of the control messages (packets). In each cycle, a control packet containing up port data (X) is followed by a high impedance (Z) state, and then a control packet containing down port data (Y) is followed by the high impedance (Z) state.

Figure 5:
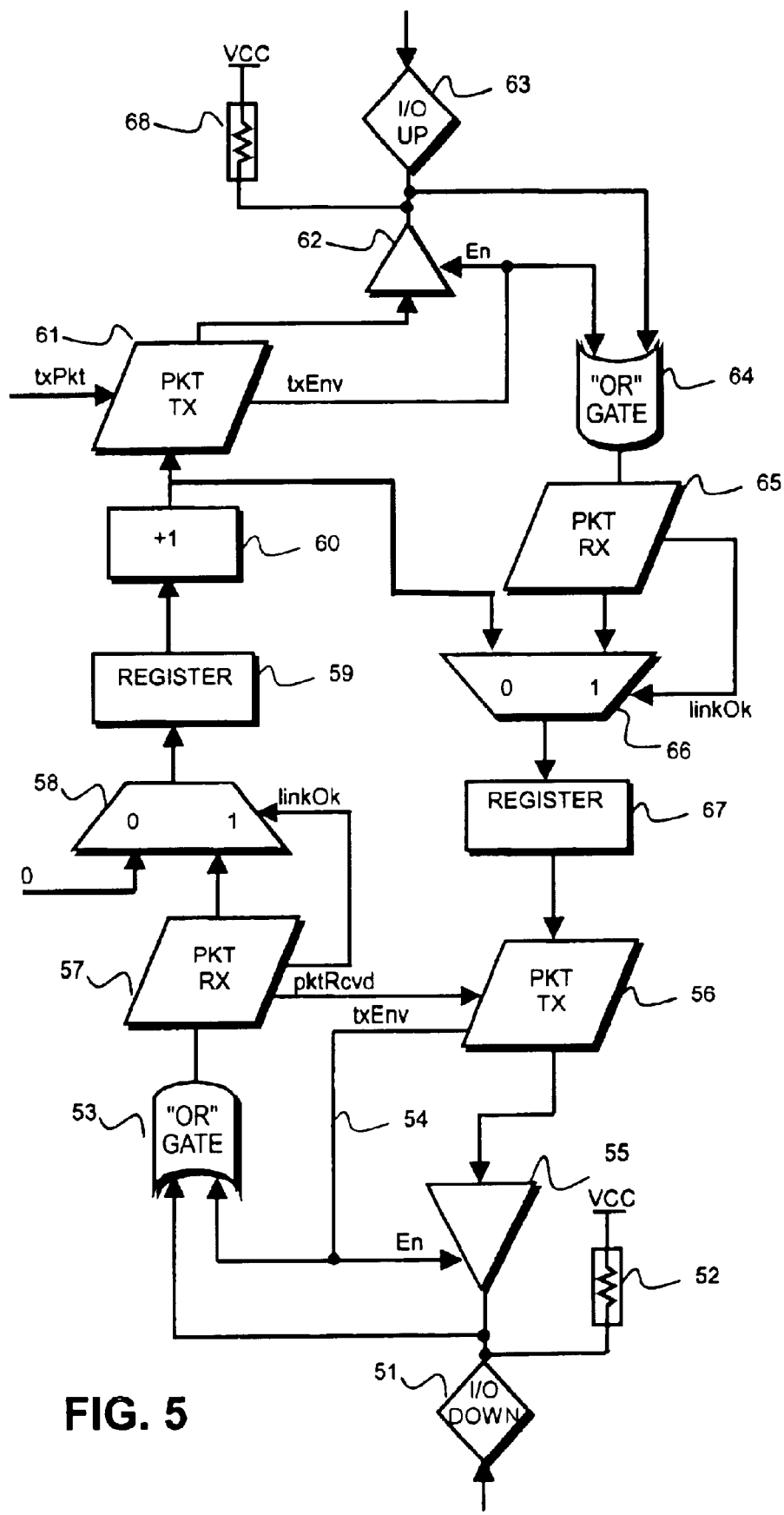
FIG. 5 illustrates a control device according to the invention, arranged to generate and respond to control messages.

FIG. 5 illustrates the control device which in this example may be provided for each of the network units in order to generate and translate the control messages.

The circuits shown in FIG. 5 has an input/output down port 51. On the input side of this terminal there is a connection by way of a pull up resistor 52 to a positive rail VCC. The port is also connected to one input of a gate 53 which can receive enable signal on a line 54 extending also to an enable input of a tristate buffer 55. This enable signal is obtained from a packet transmit circuit (PKT TX) 56.

The output of OR gate 53 is connected to a packet receive (PKT RX) circuit 57 which is coupled to one input of a multiplexer 58, the signal from the circuit 57 being coupled to the output of the multiplexer if the packet receive circuit produces a LinkOk enabling signal.

The output of the multiplexer is coupled to a 'unit ID' register 59 the output of which is incremented by one in an incrementer 60 and coupled to a packet transmit (PKT TX) circuit 61. One output of this packet transmit circuit goes to the input of a tristate buffer 62 which is connected to an input/output up terminal 63 provided with a pull up resistor 68 to the positive rail.

The circuit in the reverse direction is somewhat similar. The input/output of the up terminal is connected to an OR gate 64 of which the other input is provided with an enable signal from the packet transmit circuit 61. The output of the gate 64 goes to a packet receive (PKT RX) circuit 65 of which the output is coupled to an input of a multiplexer 66. The multiplexer can provide a LinkOk signal to the multiplexer 66, which drives a register 67.

The blocks (57,65) labelled PKT RX perform the decoding of the control messages. Their input is the serial management packets and they can provide three outputs a linkOK output which indicates continuing reception of the serial management packets, a pktRcvd output which produces a pulse or toggle signal when a control packet is received and a data value which represents the data field extracted from the received packet. If the control packet is received at an up port (63) the data field will be the active unit count value from the above unit, if the control packet is received at the down port (51) that data field will be the unitID value from the unit below. The 'pktRcvd' signal is not used on the up port.

The blocks (61,56) labelled PKT TX perform the encoding of the control messages. They have two inputs a data value and a transmit control signal. For an up port, the data value is the unitID value to be transmitted up to the above unit in the stack. For a down port the data value is the active unit count value to be propagated down the stack. The transmit control signal forces the sending of a control packet (typically a pulse or toggle signal would drive this line). For the up port this signal is driven at regular intervals (by the txPkt signal which would be directly connected to some kind of timer circuitry), thus causing the sending of control packets at regular intervals. For the down port the transmit control signal is driven by the pktRcvd signal from the down PKT RX block. Thus, control packets continually sent on the up port but are only sent on the down port in response to control packets being received on the down port, i e. the down port is the slave and the up port is the master.

The outputs of each PKT TX block are the serial control packets (containing the supplied data value) and a transmit envelope signal (txEnv). This 'txEnv' signal is active high while packet transmission is taking place and it enables the data onto the bidirectional serial data line. Between packet transmissions 'txEnv' is low and the serial data line is not driven so it can then be used for packet reception. Also, during transmission when 'txEnv' is high, packet reception is blocked by ORing the received data with txEnv (OR gates 64 and 53)—this ensures that a port does not receive its own transmissions, because (owing to the pull-up resistor) the logical 1 state is the idle state between packets.

The operation of the multiplexers is as follows:

If there is no signal received on the down port (i.e. unit is bottom of stack) PKT RX (57) produces no 'linkOK' signal and multiplexer 58 forces a value of zero into the unit ID register 59 (unit 0 is bottom of stack). UnitID is incremented by incrementer 60 before being sent up to the next unit in the stack This unit, seeing linkOK, loads the received unitID value (unit 1) into its unitID register.

A unit at the top of the stack will not see any 'linkOK' signal in respect of its up port. Thus, the multiplexer 66 will route the transmitted unitID value into the active unit count register 67. This is correct the total number of units in the stack is equal to the unit ID of the top unit plus 1 (assuming that numbering starts from zero). All units other than the top unit will see a 'linkOK' in respect of their up port and each will copy the active unit total value from the unit above into its active unit total register 67. Accordingly this value for the active unit total will propagate down the stack.

The unit ID register 59 and active unit count register 67 can be reset on power-up to an out of range value (e.g for a 4 bit counter set to all ones). The increment function (block 60) will not increment this value and the system will recognise it as being out of range, and thus invalid if it is read as a unitID or active unit count.

In the foregoing the control device shown in FIG. 5 has been described as incorporated within the network units (e g. switches) for which the cascade connection is formed. This form of the invention does not provide a 'hot swap' facility. However, by incorporating the control devices in respective modules separable from the network units and making minor consequential modification it is feasible to retain a 'hot swap' facility. Such modules may be in the general form described in the aforementioned application Ser. No. 09/662,158 and may provide in addition to the logic described in FIG. 5 transmission paths for data packets to and from the cascade.

What is claimed is:

1. A control device for use in each of plural network units that are connected in cascade for conveyance of packets therebetween, the control device comprising:
   a down port for receiving and transmitting at different times respective control messages each containing a respective count value;
   an up port for transmitting and receiving at different times respective control messages each containing a respective count value;
   a first register for storing a unit identification count value;
   a second register for storing a total unit count value; and
   control logic organized:
   (a) in an up transmitting phase:
      (i) in the presence of a valid unit identification count value in said first register, to provide for a first control message from said up port an incremented unit identification count value;
      (ii) in the absence of a valid unit identification count value in said first register to provide for said first control message an out of range count value;
      (iii) in response to a count value in a second control message received at said down port, to store the same count value in said first register; and
      (iv) in the absence of any control message at said down port, to initialize said first register with an initial valid count value; and
   (b) in a down transmitting phase distinct from said up transmitting phase:
      (i) to transmit from said down port a third control message with a count value corresponding to a count value in said second register;
      (ii) in the presence of a fourth control message at said up port, to store in said second register a count value from said fourth control message; and
      (iii) in the absence of any control message at said up port to store in said second register said incremented unit identification count value.

2. A stack of network units comprising:
   a multiplicity of multi-port network units;
   a cascade connection for the conveyance of data packets between said multi-port network units, and
   an automatic stack numbering system which comprises for each unit a control device which has an up port and a down port and control logic for sending and receiving control messages to and from the up port and the down port,
   wherein said system determines from the absence of any control message at the down port of one of the control devices that said one of the control devices is at the bottom of the stack and determines from the absence of any control messages at the up port of a second of said control devices that said second of the control devices is at the top of the stack;
   wherein said system transmits up the stack a unit identification count which is progressively incremented in successive distinct phases by each control device; and
   wherein said system transmits down the stack in phases between said successive distinct phases a total unit count value which is invalid until said second of the control devices at the top of the stack generates an incremented unit identification count whereupon said incremented unit identification count is used as the total unit count value.

3. A stack of network units comprising:
   a multiplicity of multi-port network units;
   a cascade connection for the conveyance of data packets between said multi-port network units; and
   an automatic stack numbering system including for each unit a control device which comprises:
   a down port for receiving and transmitting at different times respective control messages each containing a respective count value;
   an up port for transmitting and receiving at different times respective control messages each containing a respective count value;
   a first register for storing a unit identification count value;
   a second register for storing a total unit count value; and
   control logic organized:
   (a) in an up transmitting phase:
      (i) in the presence of a valid unit identification count value in said first register, to provide for a first control message from said up port an incremented unit identification count value, whereby numbering of said multi-port network units progresses up the stack;
      (ii) in the absence of a valid unit identification count value in said first register to provide for said first control message an out of range count value;
      (iii) in response to a count value in a second control message received at said down port, to store the same count value in said first register; and
      (iv) in the absence of any control message at said down port, to initialize said first register with an initial valid count value; and
   (b) in a down transmitting phase distinct from said up transmitting phase:

(i) to transmit from said down port a third control message with a count value corresponding to a count value in said second register;

(ii) in the presence of a fourth control message at said up port, to store in said second register a count value form said fourth control message; and (iii) in the absence of any control message at said up port to store in said second register said incremented unit identification count value, whereby said incremented unit identification count value is transmitted down the stack as a count of total multi-port network units in the stack.

4. A method for controlling each of plural network units that are connected in cascade for conveyance of packets therebetween, the method comprising:

receiving and transmitting at a down port of each unit at different times respective control messages each containing a respective count value;

transmitting and receiving at an up port of each unit at different times respective control messages each containing a respective count value;

storing a unit identification count value in each unit;

storing a total unit count value in each unit; and (a) in an up transmitting phase at each unit:
  (i) in the presence of a previously stored valid unit identification count value providing in a first control message from said up port an incremented unit identification count value;
  (ii) in the absence of a previously stored valid unit identification count value providing in said first control message an out of range count value;
  (iii) in response to a count value in a second control message received at said down port, storing the same count value as said unit identification count value; and (iv) in the absence of any control message at said down port, initializing said total unit count value with an initial valid count value; and (b) in a down transmitting phase at each unit distinct from said up transmitting phase:
  (i) transmitting from said down port a third control message with a count value corresponding to the previously stored total unit count value;
  (ii) in the presence of a fourth control message at said up port, storing as said total unit count value a count value from said fourth control message; and
  (iii) in the absence of any control message at said up port, storing as said total unit count value said incremented unit identification count value.

5. A method for controlling each of plural stacked multi-port network units connected in cascade for conveyance of data packets therebetween, said method comprising:

at each unit having an up port and a down port, sending and receiving control messages to and from the up port and the down port, wherein the absence of any control message at the down port of a first one of the units determines that the unit is at the bottom of the stack and the absence of any control messages at the up port of a second one of the units determines that the unit is at the top of the stack;

wherein a unit identification count is transmitted up the stack which is progressively incremented in successive distinct phases by each unit; and wherein a total unit count value is transmitted down the stack in phases between said successive distinct phases which is invalid until the unit at the top of the stack generates an incremented unit identification count whereupon said incremented unit identification count is used as the total unit count value.

* * * * *